(12) United States Patent
Cheng et al.

(10) Patent No.: US 7,911,190 B2
(45) Date of Patent: Mar. 22, 2011

(54) REGULATOR WITH AUTOMATIC POWER OUTPUT DEVICE DETECTION

(75) Inventors: Dongjie Cheng, Murphy, TX (US); Joao Carlos Brito, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 636 days.

(21) Appl. No.: 11/674,820

(22) Filed: Feb. 14, 2007

(65) Prior Publication Data

US 2008/0191674 A1 Aug. 14, 2008

(51) Int. Cl.
  *G05F 1/00* (2006.01)
(52) U.S. Cl. ........................................... 323/272
(58) Field of Classification Search .................. 323/272
  See application file for complete search history.

(56) References Cited

U.S. PATENT DOCUMENTS

| | | | |
|---|---|---|---|
| 5,502,610 | A | 3/1996 | Chaney |
| 6,922,041 | B2 | 7/2005 | Goder et al. |
| 2001/0015639 | A1 | 8/2001 | Aas et al. |
| 2002/0017897 | A1 | 2/2002 | Wilcox et al. |
| 2004/0155804 | A1 | 8/2004 | Dedic |
| 2005/0046405 | A1 | 3/2005 | Trafton et al. |
| 2005/0242792 | A1* | 11/2005 | Zinn .............................. 323/268 |

* cited by examiner

*Primary Examiner* — Adolf Berhane
*Assistant Examiner* — Jue Zhang
(74) *Attorney, Agent, or Firm* — Dawn V. Stephens; Wade James Brady, III; Frederick J. Telecky, Jr.

(57) ABSTRACT

A switching regulator (20) including an on-chip power output function (24) and also an interface (26) to which off-chip power output devices (42PU, 42PD) may be connected is disclosed. The switching regulator (20) includes an output enable circuit (25, 125) that senses the presence of external components at one of the terminals (T_PD, TL) of the on-chip power output function (24) or of the interface (26) to determine which of the output functions to enable. In one disclosed embodiment, the output enable circuit (25) detects whether an off-chip power transistor (T_PD) is connected at the interface (26), by charging a passive circuit (R1, C1) and determining whether the charging time constant is affected by the gate capacitance of the external transistor (42PD). In another disclosed embodiment, the output enable circuit (125) detects whether a load (30L) is connected to the output of the on-chip power output function (24) by measuring the voltage across a resistor (R1), into which a mirrored current is sourced, based on a current applied to the external terminal (TL); if the load (30L) is present, the voltage across the resistor (R1) will cause a logic transition to enable the on-chip power output function (24).

14 Claims, 4 Drawing Sheets

REGULATOR WITH AUTOMATIC POWER OUTPUT DEVICE DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of electronic circuits, and is more specifically directed to switching voltage regulators.

As is well known in the electronics art, stable voltage levels are of tremendous importance in many circuit and system applications, particularly those in which the absolute voltage level impacts the accuracy or fidelity of the resulting system. One such system application in which stable voltages are essential is the well-known magnetic disk drive, in which data is written and read to magnetic media. Modern disk drives typically use a servo-controlled "spindle" motor to rotate the disk surfaces under a flying magnetic read-write head, and a servo-controlled "voice-coil" motor to move and control the radial position of the head over the magnetic disk drive surfaces. These motors, and also the read and write amplifier circuitry, require stable voltages in order for the data storage and retrieval to be accurate and reliable.

Switching regulators are well-known voltage regulator circuits that generate a stable, regulated, voltage at an output, by rapidly switching power transistors (typically metal-oxide-semiconductor field-effect transistors, or MOSFETs) on and off. These switching regulators are thus able to quickly establish and efficiently maintain a well-regulated output voltage over a wide range of load characteristics. The regulation function is accomplished by feedback control of the switching of the power MOSFET devices. For example, in the case of a push-pull power output stage, if the output voltage is below the desired level, the duty cycle of the pull-up device can be increased to pull up the voltage at the output; conversely, if the output voltage is too high, the duty cycle of the pull-down device can be increased to pull the output voltage down to the desired level. Other output configurations can also be feedback-controlled, as appropriate. Modern switching regulators are typically highly efficient, dissipate modest amounts of power, and occupy relatively small chip and circuit board area, and as such are well-suited for applications such as magnetic disk drive systems.

As will be evident to those skilled in the art, switching regulators can either have their power MOSFET output driver transistors integrated into the same integrated circuit as the feedback and control circuitry (i.e., "on-chip"), or instead can have terminals to which external power MOSFET devices are connected and driven by the regulator circuit (i.e., "off-chip"). The decision of whether on-chip power MOSFET output driver transistors are sufficient or whether instead off-chip power MOSFET output driver transistors are to be used is made by the system designer, based on such factors as the expected load to be presented to the regulator, the form factor and integrated circuit board space available for off-chip MOSFETs, heat dissipation considerations, and the like.

However, to the integrated circuit manufacturer, it is inefficient from the standpoint of design and manufacturing resources, as well as from an inventory control and forecasting standpoint, to provide switching regulator integrated circuit devices of separate types for each regulator design, one type having on-chip power MOSFET output driver transistors included in the integrated circuit, and the other type arranged for driving off-chip power MOSFET devices. This inefficiency becomes especially costly for controller and power management devices that integrate programmable and complex control functions, along with one or more switching regulators, into a single integrated circuit. These large-scale single-chip power management integrated circuits are becoming especially desirable for small form-factor systems, such as the miniaturized disk drive systems now popular in modern laptop computers, and portable audio players.

Accordingly, it would be desirable to include both on-chip power MOSFET output devices, and also the capability and interface circuitry for off-chip power MOSFET devices, in modern integrated circuits that realize switching regulators. However, especially where power dissipation is a concern (as is the case in small form-factor systems such as those mentioned above), it is undesirable to operate the switching regulator to drive on-chip power MOSFET devices when the integrated circuit is in fact being used to drive off-chip power MOSFET devices. In addition, the switching of the on-chip power MOSFET devices when off-chip power MOSFET devices are being used generates substantial noise in the system, degrading the ability of the switching regulator to maintain a stable output voltage and also generally degrading the operation of the system. It is also not possible, in some system applications, to programmably control the switching regulator to select one of its two possible outputs. The use of a jumper or other hard-wired selection technique to make this selection is cumbersome to the system implementer, and in fact may not be available in some applications.

BRIEF SUMMARY OF THE INVENTION

It is therefore an object of this invention to provide a switching regulator circuit that is capable of driving either on-chip power output devices or off-chip power output devices, and that can automatically sense which of the two output configurations to use.

It is a further object of this invention to provide circuitry and a corresponding method for detecting whether off-chip power output devices are connected to the switching regulator, in order to determine which output configuration to enable.

It is a further object of this invention to provide circuitry and a corresponding method for detecting whether a load is coupled to the on-chip power output devices, in order to determine which output configuration to enable.

It is a further object of this invention to provide such circuitry and such methods that are operable automatically on power-up, in which the selection state is unconditionally maintained until power-down, thus preventing errors in operation.

Other objects and advantages of this invention will be apparent to those of ordinary skill in the art having reference to the following specification together with its drawings.

The present invention may be implemented into a switching regulator circuit having both on-chip power output driver transistors, and also terminals and interface circuitry for driving off-chip power output driver transistors. The circuit includes a "one-shot" circuit that produces a pulse for a selected time, during which measurements at one of the available outputs are made. During the duration of the pulse, logic circuitry is enabled to respond to the output measurement, and to set the state of an output latch accordingly. According to one approach, measurements are made at the terminals to which off-chip power output driver transistors would be connected, to determine whether such transistors are present; another approach determines whether a load is coupled to the output of the on-chip power output driver transistors. Once the pulse from the one-shot terminates, further resetting of the latch is locked-out until the next power-on sequence. The switching regulator disables one of its available outputs (on-chip or off-chip) in response to the state of the latch.

DETAILED DESCRIPTION OF THE INVENTION

The present invention will be described in connection with its preferred embodiment, namely as implemented into a switching regulator in a hard disk drive system, because it is contemplated that the invention is especially beneficial to such an application. However, it is contemplated that this invention will be beneficial when used in switching regulators, and indeed any circuits having both on-chip power drive devices and also the capability of using off-chip power drive devices. Accordingly, it is to be understood that the following description is provided by way of example only, and is not intended to limit the true scope of this invention as claimed.

Figure 1:
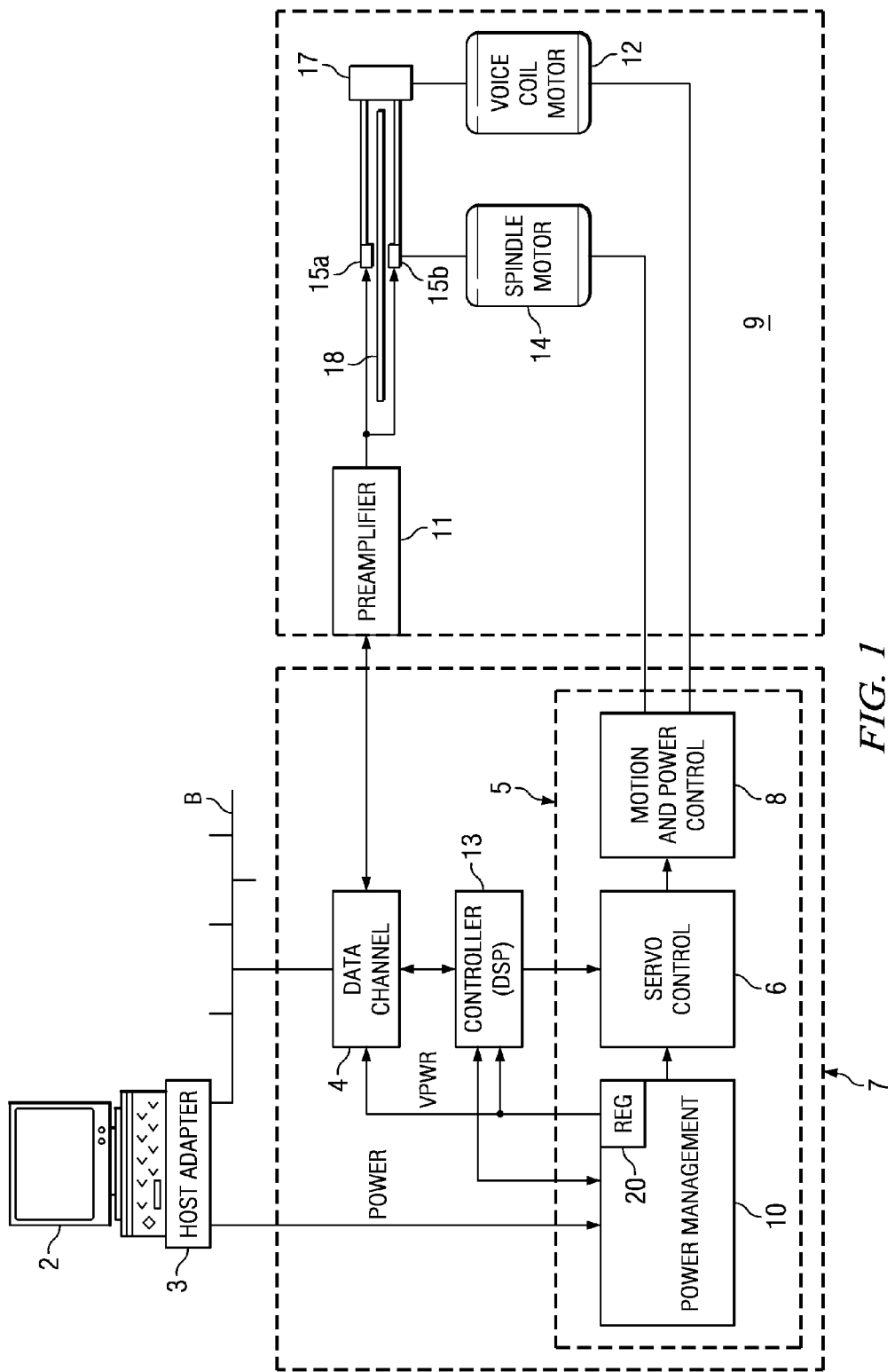
FIG. 1 is an electrical diagram, in block and schematic form, of a disk drive system constructed according to the preferred embodiments of the invention.

FIG. 1 illustrates an example of a computer including a disk drive system, into which the preferred embodiment of the invention is implemented. In this example, personal computer or workstation 2 is realized in the conventional manner, including the appropriate central processing unit (CPU), random access memory (RAM), video and sound cards or functionality, network interface capability, and the like. Also contained within computer 2 is host adapter 3, which connects on one side to the system bus of computer 2, and on the other side to bus B, to which disk drive controller 7 is connected. Bus B is preferably implemented according to conventional standards, examples of which include the Enhanced Integrated Drive Electronics (EIDE) standard or the Small Computer System Interface (SCSI) standard. Other disk storage devices (hard disk controllers, floppy drive controllers, etc.) and other peripherals may also be connected to bus B, as desired and in the conventional manner. Alternatively, system 2 may be a smaller-scale system, such as a portable digital audio player or the like.

Head-disk assembly 9 of the disk drive system includes the electronic and mechanical components that are involved in the writing and reading of magnetically stored data. In this example, head-disk assembly 9 includes one or more disks 18 having ferromagnetic surfaces (preferably on both sides) that spin about their axis under the control of spindle motor 14. Multiple read/write head assemblies 15a, 15b are movable by actuator 17, and are coupled to preamplifier 11. Preamplifier 11 receives sensed currents from read/write head assemblies 15a, 15b in disk read operations, and amplifies and forwards signals corresponding to these sensed currents to data channel circuitry 4 in disk drive controller 7; preamplifier function 11 also receives data to be written to a particular location of disk 18 from data channel 4, and includes write circuitry that converts these data to the appropriate signals for writing to disk 18 via read/write head assemblies 15a, 15b.

Disk drive controller 7, in this example, corresponds to a disk drive controller architecture in which the drive electronics are physically implemented at the disk drive, rather than as a controller board within computer 2 itself. Of course, in larger scale systems, controller 7 may be implemented within computer 2. In the generalized block diagram of FIG. 1, controller 7 includes several integrated circuits, including data channel 4, through which the data path between computer 2 and preamplifier function 11 passes, as mentioned above. Disk drive controller 7 also includes controller 13, which is preferably implemented as a digital signal processor (DSP) or other programmable processor, along with the appropriate memory resources (not shown), which typically include some or all of read-only memory (ROM), random access memory (RAM), and other non-volatile storage such as flash RAM. Controller 13 controls the operation of the disk drive system, including such functions as address mapping, error correction coding and decoding, and the like. Interface circuitry coupled between bus B and data channel 4, and other custom logic circuitry including clock generation circuits and the like also may be included within disk drive controller 7.

According to the architecture of disk drive controller 7 in this example, power management circuit 5 is an integrated circuit included within disk drive controller 7. Servo control 6 is realized within power management circuit 5, and communicates with motion and power controller 8, which drives voice coil motor 12 and spindle motor 14 in head-disk assembly 9. As known in the art, these motors 12, 14 spin disks 18 about their axis and position actuator 17, respectively, so that read/write heads 15a, 15b are positioned at the desired location of disks 18 according to an address value communicated by controller 13. Accordingly, signals from motion and power control function 8 in controller 5 control spindle motor 14 and voice coil motor 12 so that actuator 17 places the read/write head assemblies 15a, 15b at the desired locations of disk surface 18 to write or read the desired data.

Power management circuit 5, according to this preferred embodiment of the invention, also includes power management function 10 that receives power from computer 2 on line PWR as shown in FIG. 1; line PWR may be a power line of bus B, or may be a separate power connection to the power supply of computer 2. Power management function 10 includes one or more voltage regulators, by way of which it generates and controls various voltages within disk drive controller 7 and also within head-disk assembly 9. One or more of these voltage regulators is realized as switching regulator 20, which as shown in FIG. 1 produces one or more regulated voltages (represented by line VPWR in the Figure) communicated to data channel 4 and controller 13. In the preferred embodiments of this invention, switching regulator 20 generates and applies power on line VPWR to data channel 4 and controller 13, and as such the current sourced by switching regulator 20 can be substantial. Also in this example, additional voltage regulators in power management circuit 5 generate regulated voltages and power to servo control 6, and motion and power control 8 that, in this example, are embodied within power management circuit 5. These other regulators may be switched regulators, or alternatively may be constructed as charge pump or linear regulators. Power to voice coil motor 12, and spindle motor 14 is typically provided directly from host system 2 or adapter 3 (e.g., via switches within motion and power control function 8), but alternatively may be supplied by voltage regulators in power management circuit 5 if desired.

In this architecture of disk drive controller 7, as is typical in the art, power management circuit 5 is the integrated circuit in disk drive controller 7 that first receives power from computer 2 (as shown by power line PWR in FIG. 1), and that "wakes up" the other functions of disk drive controller 7 by generating and applying power supply voltage VPWR. As such, controller 13 is not able to define the operating state of power management circuit 5 (and of switching regulators 20 within power management circuit 5), because controller 13 is not powered on at the time that power management circuit 5 becomes powered on. As such, the operating state of functions such as switching regulators 20 within power management circuit 5 must be established within and by power management circuit 5 itself. Once powered up, controller 13 may communicate control signals to power management circuit 5 to adjust the voltage on line VPWR, in response to which switching regulator 20 will in turn adjust its operation.

Figure 2:
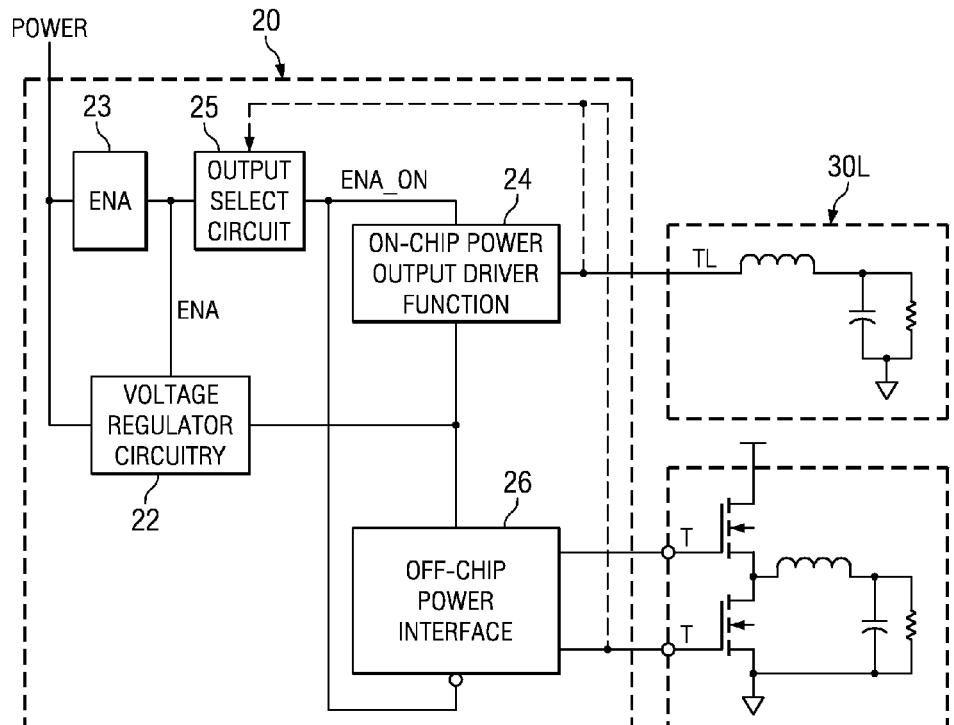
FIG. 2 is an electrical diagram, in block and schematic form, of a switching regulator in the system of FIG. 1, constructed according to the preferred embodiments of the invention.

Referring now to FIG. 2, the architecture of switching regulator 20 according to the preferred embodiments of the invention will now be described. As shown in FIG. 2, switching regulator 20 receives a power supply voltage on line PWR, directly or indirectly from computer 2, which is applied to voltage regulator circuitry 22. Voltage regulator circuitry 22 is conventional regulator circuitry that produces output drive signals at a desired voltage from the power supply voltage on line PWR, constructed in the conventional manner for switching regulators as known by those skilled in the voltage regulator art. Line PWR is also received by enable gate 23, which generates an enable signal ENA that is applied to output select circuit 25 and to voltage regulator circuitry 22. Enable signal ENA is a logic level signal that indicates, when active, that power is present on line PWR. According to this embodiment of the invention, enable signal ENA makes a low-to-high transition in response to the powering up of line PWR, and remains at its high, active, level as long as the voltage on line PWR is sufficient.

As evident from FIG. 2, switching regulator 20 according to the preferred embodiments of the invention drives its output signals to on-chip power output driver function 24, and also, in parallel, to off-chip power interface 26. On-chip power output driver function 24 typically includes a pair of power metal-oxide-semiconductor field-effect transistors (MOSFETs), arranged in a push-pull fashion. These power MOSFET devices are typically quite large in drive and physical size (i.e., channel width/length ratio), and are capable of driving an off-chip inductive load 30L as shown in FIG. 2. Off-chip power interface 26 has output terminals T to which the gates of one or more power MOSFET devices may be connected. FIG. 2 illustrates circuit 30OC, which includes a pair of such power MOSFET devices arranged as a push-pull driver, with their gates coupled to respective terminals T driven from off-chip power interface 26, and which also includes an inductive load driven by these power MOSFET devices. Of course, various other power output configurations may be driven by switching regulator 20, including open-drain or open-emitter configurations, or push-pull bipolar transistor power output devices.

According to the preferred embodiments of the invention, both on-chip power output function 24 and off-chip power interface 26 include a gating function, by way of which each is enabled or disabled. As shown in FIG. 2, output select circuit 25 generates a control signal ENA_ON that is applied to each of on-chip power output function 24 and off-chip power interface 26, to enable one of these functions and disable the other (e.g., as shown in FIG. 2 by way of off-chip power interface 26 receiving control signal ENA_ON at an inverting input). It is preferred that on-chip power output function 24 and off-chip power interface 26 are enabled in a mutually exclusive fashion, to avoid power from being dissipated via both output types.

According to the preferred embodiments of the invention, output select circuit 25 responds to a transition of enable signal ENA by determining which of the on-chip power output function 24 and off-chip power interface 26 have output circuitry connected thereto, and thus which is to be enabled and which is to be disabled. As will be described in further detail below, this determination by output select circuit 25 is performed on power-up (i.e., in connection with the transition of enable signal ENA), and is maintained until switching regulator 20 is powered back down, and then powered up again. According to a first preferred embodiment of the invention, output select circuit 25 makes this determination by way of a feedback signal from the output of off-chip power interface 26, while according to a second preferred embodiment of the invention, output select circuit 25 makes this determination by way of a feedback signal from the output of on-chip output driver function 24. It is contemplated that only one of these two feedback signals will be sufficient for this selection; of course, both feedback signals may be used, if desired, to ensure that at least one of on-chip power output function 24 and off-chip power interface 26 is operable.

Enable signal line ENA is applied to one input of exclusive-OR gate 34, and to delay stage 36. The output of delay stage 36, on line ENA_D, is thus a delayed version of the enable signal received on line ENA. Line ENA_D is applied to a second input of exclusive-OR gate 34, such that the output of exclusive-OR gate 34 is a pulse beginning with a low-to-high transition on line ENA, and ending with a low-to-high transition on line ENA_D. As such, the combination of delay stage 36 and exclusive-OR gate 34 is a "one-shot", generating a pulse of a duration corresponding to the propagation delay of delay stage 36, beginning with an active transition on line ENA.

The output of exclusive-OR gate 34 is applied to the gate of n-channel MOSFET 39, which has its drain coupled to power supply $V_{dd}$ via current source 38, and its source coupled to ground via resistor R1 and capacitor C1, in parallel. Capacitor C1 preferably represents merely the parasitic capacitance associated with metal routing within the integrated circuit that includes switching regulator 20, with gate capacitance of MOSFET devices within that integrated circuit and connected to that node, with the bond pad or pads associated with terminal T_PD, and also with the package leadframe connected to terminal T_PD; it is preferable, for purposes of this invention, that this parasitic capacitance represented by capacitor C1 be as small as possible. The node at the source of MOSFET 39 is also connected to one input of AND gate 40, which receives line ENA_D (inverted) at its other input. The output of AND gate 40 is connected to an input of AND gate 32, which receives line ENA at its other output. The output of AND gate 32 is connected to the reset input of R-S latch 35, which drives select line ENA_ON at its inverting output. The set input of latch 35 receives the state of line ENA, after inversion by inverter 33.

In addition, the node at the source of MOSFET 39, and thus at the parallel connection of resistor R1 and parasitic capacitance C1, is also connected to terminal T_PD, which is the terminal at which an off-chip power MOSFET will be driven; in this case, terminal T_PD will drive the gate of the pull-down power MOSFET if present. Terminal T_PU is also provided, for connection to the gate of the pull-up power MOSFET if present. Terminals T_PU and T_PD are connected to off-chip power interface 26 (FIG. 2) in parallel with output select circuit 25.

Figure 3:
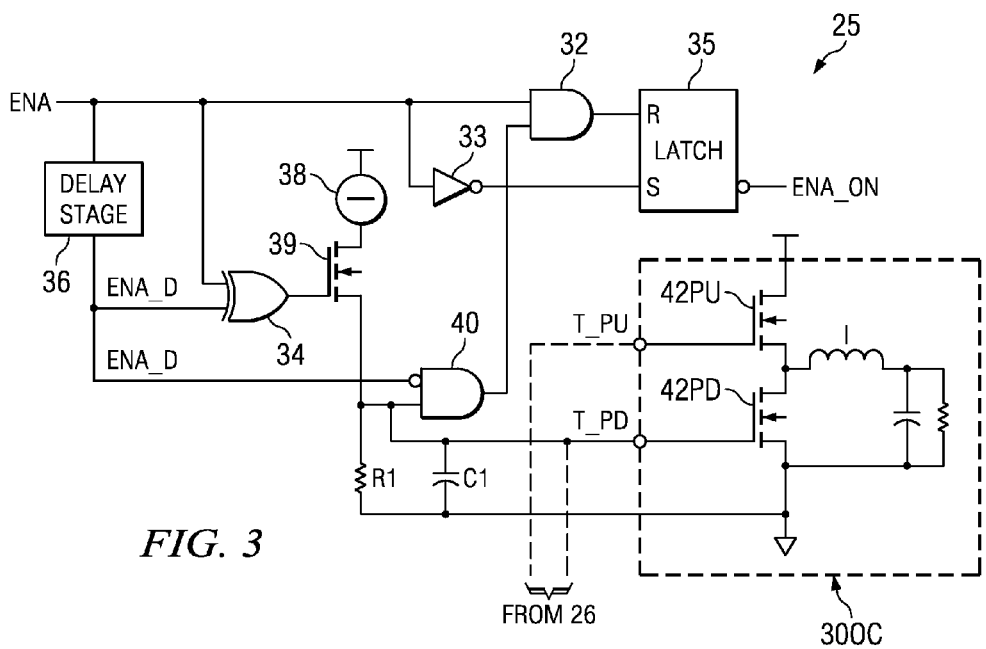
FIG. 3 is an electrical diagram, in schematic form, of control circuitry in the switching regulator of FIG. 2, constructed according to a first preferred embodiment of the invention.

For clarity, on-chip power output driver function 24 is not illustrated in FIG. 3, but is of course present within switching regulator 20. For purposes of this first preferred embodiment of the invention, output select circuit 25 enables the appropriate output by measuring whether off-chip power MOSFETs are connected to terminals T_PD, T_PU. As such, the presence of on-chip power output driver function 24 is not relevant to the operation of output select circuit 25. And FIG. 3 illustrates the case in which circuit 30OC including off-chip power MOSFETs 42PU, 42 PD, and an inductive load (including inductor I) is in fact connected to terminals T_PD, T_PU. The gate of power MOSFET 42PU is connected to terminal T_PU, and the gate of power MOSFET 42PD is connected to terminal T_PD.

Figure 4:
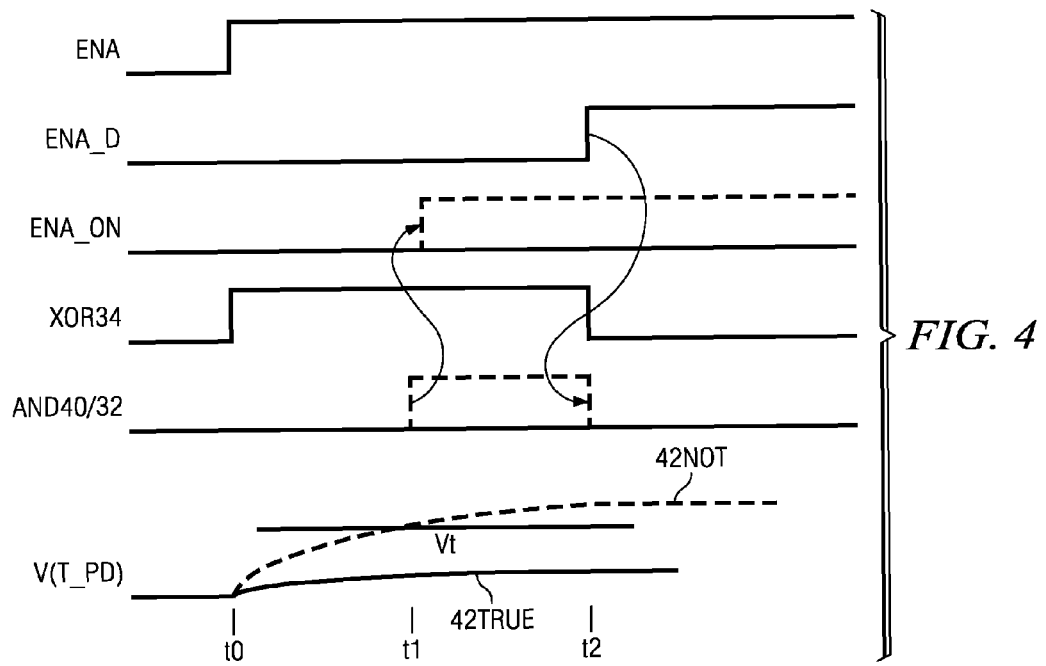
FIG. 4 is a timing diagram illustrating the operation of the circuit of FIG. 3, according to the first embodiment of the invention.

The operation of output select circuit 25 according to this first preferred embodiment of the invention will now be described in connection with the timing diagram of FIG. 4. Prior to time t0, as shown in FIG. 4, line ENA is at a low logic level. This time prior to time t0 occurs shortly after and during the power-up sequence of switching regulator 20. As inverter 33 (and R-S latch 35) power up, the low initial level of line ENA results in a low-to-high transition at the set input of latch 35, thus setting latch 35 to an initial state in which line ENA_ON (at the inverting output of latch 35) is initially at a low logic level as shown in FIG. 2. Also at this initial time prior to time t0, both line ENA and also line ENA_D from delay stage 36 are at low logic levels, such that the output of exclusive-OR gate 34 (line XOR34 of FIG. 4) is also low, turning off transistor 39. Since parasitic capacitance C1 is not initially charged, resistor R1 pulls its input to AND gate 40 low, and as such the output of AND gate 40 is at an initial low level, forcing the output of AND gate 32 also to an initial low level.

At time t0, line ENA is driven high by enable function 23 (FIG. 2). This transition on line ENA causes AND gate 32 to now be responsive to the state at the output of AND gate 40. This transition also causes exclusive-OR gate 34 to drive its output (line XOR34) high, considering that the transition of line ENA has not yet propagated through delay stage 36 (and does not do so until later, at time t2). Transistor 39 is turned on by exclusive-OR gate 39, and begins to conduct the current from current source 38 into the network of resistor R1 and parasitic capacitance C1. Capacitance C1 thus begins to charge up, raising the voltage at the source of transistor 39, which is connected to terminal T_PD. If power MOSFET 42PD is connected to terminal T_PD, the current conducted from current source 38 through transistor 39 also begins to charge the gate capacitance of power MOSFET 42PD. As mentioned above, off-chip power MOSFETs 42PU, 42PD are typically very large devices, and as such their respective gate capacitances will be substantial.

According to this first preferred embodiment of the invention, therefore, the presence or absence of power MOSFET 42PD determines the time constant at which terminal T_PD is charged by current source 38, during the time that transistor 39 is turned on (after the transition of line ENA and before this transition propagates through delay stage 36). If power MOSFET 42PD is not present, the voltage at terminal T_PD can thus be derived as:

$$V_{T\_PD} = I \cdot R1 (1 - e^{-\frac{t}{R1 \cdot C1}})$$

where I is the current from current source 38. The time constant of this charging is the RC product of resistor R1 and capacitance C1. On the other hand, if power MOSFET 42PD is present, its gate capacitance Cg is in parallel with parasitic capacitance C1. Typically and preferably, the gate capacitance Cg is much larger than parasitic capacitance C1. The time constant of the charging of the voltage at terminal T_PD is thus the RC product of resistor R1 and the sum of capacitances C1 and Cg:

$$V_{T\_PD} = I \cdot R1 (1 - e^{-\frac{t}{R1(C1+Cg)}})$$

This longer time constant for the case in which power MOSFET 42PD is present thus means that transistor 39 charges the node at terminal T_PD more slowly with power MOSFET 42PD connected to terminal T_PD, than it does if power MOSFET 42PD is not present. This is illustrated in FIG. 4. Plot 42NOT of FIG. 4 illustrates the voltage response at terminal T_PD if the smaller time constant R1C1 controls (i.e., power MOSFET 42PD is not present), and plot 42TRUE illustrates the voltage response if the larger time constant R1(C1+Cg) controls (i.e., power MOSFET 42PD is present).

Beginning from prior to time t0, and continuing until the transition at line ENA propagates through delay stage 36, line ENA_D is at a low logic level. This state, as applied to an inverting input of AND gate 40, permits AND gate 40 to respond at its output according to the state of its other input, which is connected to terminal T_PD. As shown in FIG. 4, voltage threshold $V_t$ refers to the input threshold level at which AND gate 40 changes states (from low to high in this example) during this time. In the example shown in FIG. 4, if no power MOSFET is connected to terminal T_PD, its voltage will have charged to a level above threshold $V_t$ (as shown by plot 42NOT) at time t1. This causes AND gate 40 to drive a high logic level at its output, which in turn causes AND gate 32 (receiving line ENA at its other input), to drive its output from low to high. This edge is applied to the reset input of latch 35, causing latch 35 to reset, and drive its inverting output high, on line ENA_ON. As described above, a high level on line ENA_ON enables on-chip power output function 24, and disables off-chip power interface 26. Switching regulator 20 thus operates using its on-chip power MOSFETs.

The charging of capacitor C1 continues until the transition of line ENA propagates through delay stage 36, which occurs at time t2 in the example of FIG. 4 (as shown by line ENA_D of FIG. 4 going high). At this time t2, the output of exclusive-OR gate 34 returns low (both of its inputs now being at a high level), turning off transistor 39. In addition, this inverting input of AND gate 40 receives the high level on line ENA_D, which disables both AND gate 40 and AND gate 32 from driving any additional transitions at their respective outputs. Accordingly, following time t2, no further charging or other state at terminal T_PD can affect the state of latch 35. So long as switching regulator 20 remains powered (i.e., line ENA remains high), no other event can cause latch 35 to be set so that line ENA_ON is taken low again. The automatic sensing that no off-chip power MOSFET is connected to switching regulator 20 is thus complete, and is not repeated until another power cycle.

If, on the other hand, power MOSFET 42PD is in fact connected to terminal T_PD as shown in FIG. 3, the voltage at terminal T_PD will not have yet reached threshold voltage $V_t$ by the time that line ENA_D from delay stage 36 goes high, at time t2. And therefore, by this time, AND gate 40 has not yet driven its output high to reset latch 35 (via AND gate 32). But upon line ENA_D from delay stage 36 going high at time t2, AND gate 40 is then locked-out from responding to further charging at terminal T_PD; in addition, exclusive-OR 34 turns off transistor 39 at time t2 anyway, preventing further charging from current source 38. In this event, state at the output of AND gate 40 will remain low because the voltage at terminal T_PD is below threshold voltage $V_t$ at this time t2. As a result, latch 35 is not reset, because the output of AND gate 32 remains low. Latch 35 therefore continues to maintain its inverting output level, on line ENA_ON, at a low logic level. As discussed above, this state enables off-chip power interface 26, and disables on-chip power output function 24. As described above, further changes to the state of latch 35 are locked out so long as line ENA remains active high, and switching regulator 20 thus continues to drive off-chip power MOSFETS 42PU, 42PD.

One design example for the sizes of the devices used in an implementation according to the preferred embodiment of the invention uses about 91 μA for the current sourced by current source 38, a resistance of 100 kΩ for resistor R1, and a total capacitance C1+Cg of 100 pF (of which capacitance Cg dominates), for a threshold voltage $V_t$ of 1.65 volts, and where time t1 occurs at about 2 μsec after time t0. Typically, parasitic capacitance C1 will be on the order of only a few pF, so that the difference in the charging time constant between power MOSFET 42PD being connected and power MOSFET 42PD not being connected will be sufficient to distinguish between the two cases. The propagation delay of delay stage 36 is preferably selected so that the delay between times t0 and t2 is on the order of twice the delay between times t0 and t1.

Figure 5:
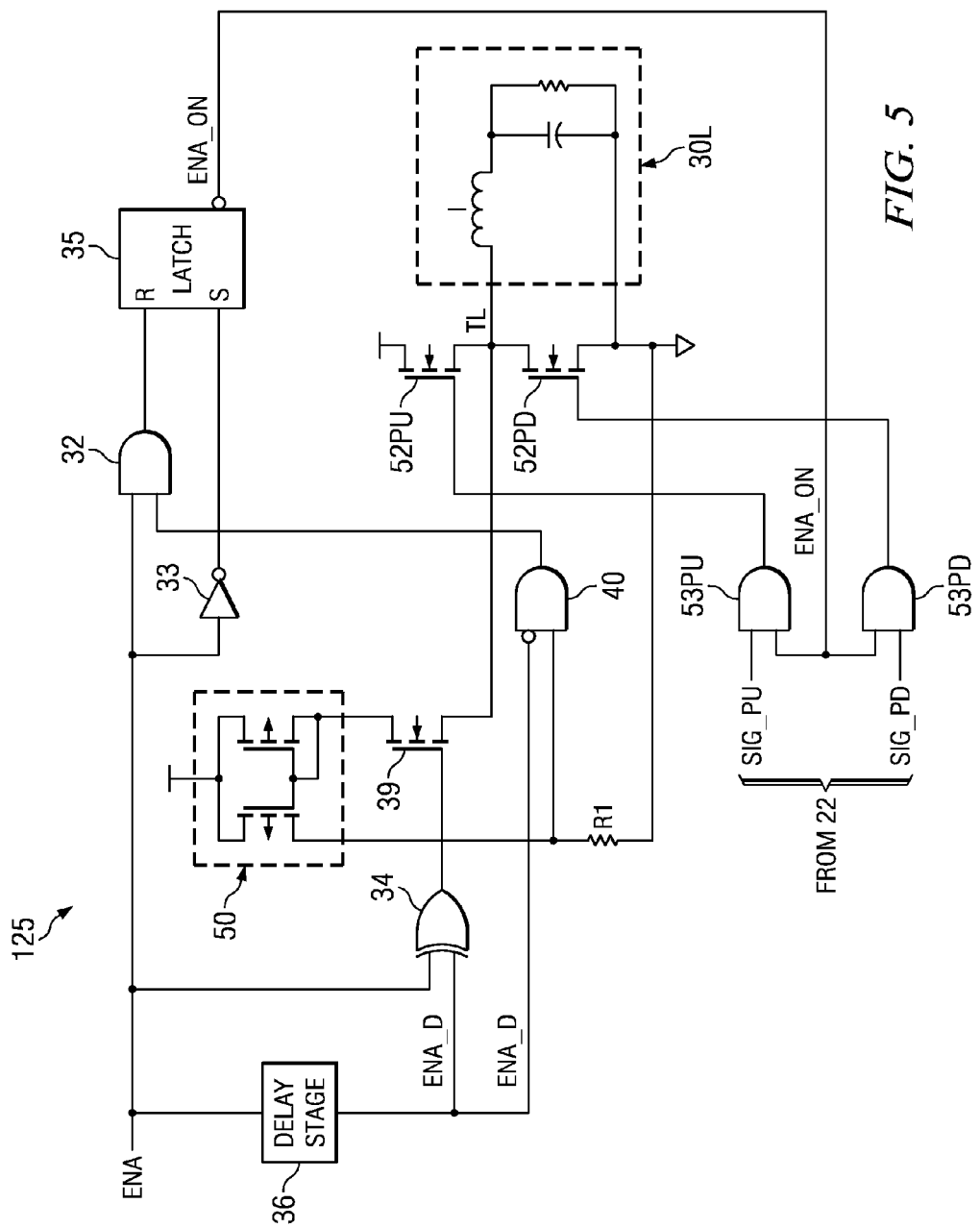
FIG. 5 is an electrical diagram, in schematic form, of control circuitry in the switching regulator of FIG. 2, constructed according to a second preferred embodiment of the invention.

Referring now to FIG. 5, the construction and operation of a second preferred embodiment of the invention will now be described in detail. Output select circuit 125 is shown in FIG. 5, and includes many of the same elements and components as output select circuit 25 of FIG. 3, described above; these same elements and components are referred to by the same reference numerals, and function in the same manner as described above in connection with the first preferred embodiment of the invention. For clarity, however, off-chip power output interface 26 is not illustrated in FIG. 3, but is of course present within switching regulator 20. For purposes of this second preferred embodiment of the invention, output select circuit 125 enables the appropriate output by measuring whether a load is connected to the on-chip power MOSFETs of switching regulator 20. As such, the presence of off-chip power output interface 26 is not relevant to the operation of output select circuit 125, even if external power MOSFET devices are in fact connected.

In output select circuit 125 according to this second preferred embodiment of the invention, exclusive-OR gate 34 drives the gate of n-channel MOSFET 39 with an active high level during the delay period of delay stage 36 following a low-to-high transition of enable signal ENA on power-up. In this embodiment of the invention, the drain of transistor 39 is coupled to the $V_{dd}$ power supply via one leg of current mirror 50. The other leg of current mirror 50 is connected through resistor R1 to ground; the node between resistor R1 and current mirror 50 is applied to an input of AND gate 40. According to this embodiment of the invention, the source-drain current through transistor 39 is mirrored as a current conducted by resistor R1 (divided by a mirror factor M. As a result, the voltage across resistor R1, at the input to AND gate 40, responds proportionally to the current conducted by transistor 39. If there is no current through transistor 39, this input to AND gate 40 is at ground through resistor R1, and the output of AND gate 40 is forced low.

The source of transistor 39 is connected to terminal TL. Terminal TL is connected between on-chip power MOSFET 52PU and on-chip power MOSFET 52PD, and serves as the output terminal of switching regulator 20 when driven from on-chip power output function 24. As such, load 30L is connected to terminal TL in those system applications in which the on-chip power MOSFETs 52 are being used. Load 30L includes inductor I, as well as capacitive and resistive load characteristics, as known in the art. Pull-up on-chip power MOSFET 52PU is an n-channel MOSFET, with its drain connected to the $V_{dd}$ power supply and its source at terminal TL; pull-down on-chip power MOSFET 52PD is also an n-channel device, with its drain connected to terminal TL, and its source at ground. The gates of power MOSFETs 52PU, 52PD are driven from lines SIG_PU, SIG_PD, respectively, by voltage regulator circuitry 22 via enable gates 53PU, 53PD. Each of enable gates 53PU, 53PD are AND gates receiving enable line ENA_ON at one input, and the corresponding signal line SIG_PU, SIG_PD at another input. The gates of enable gates 53PU, 53PD drive the gates of power MOSFETs 52PU, 52PD, respectively.

Figure 6:
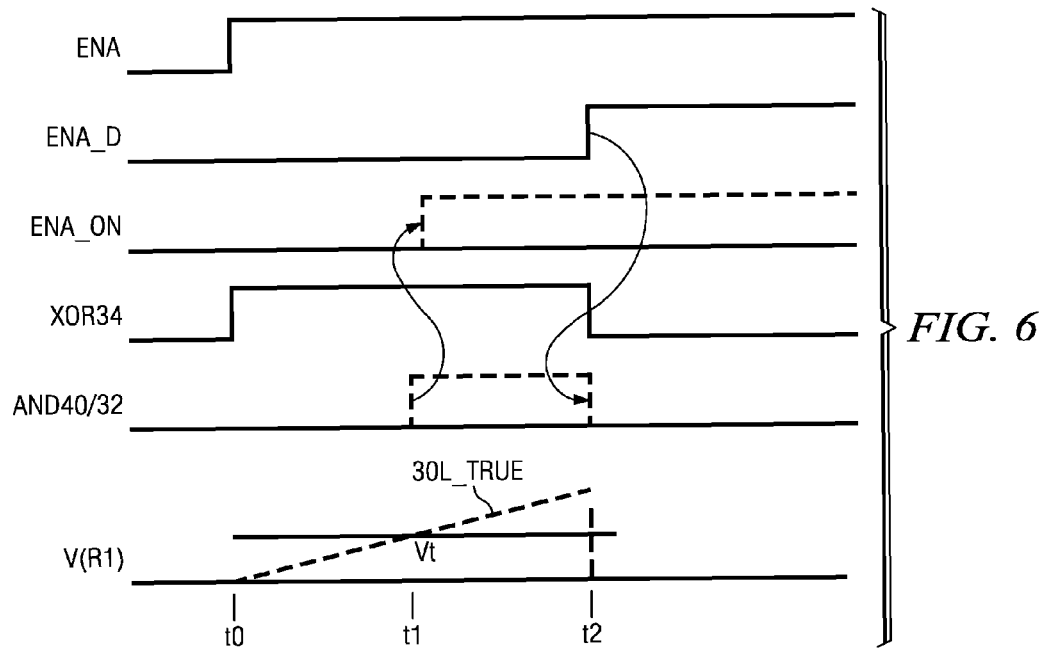
FIG. 6 is a timing diagram illustrating the operation of the circuit of FIG. 5, according to the second embodiment of the invention.

In operation, output select circuit 125 of this second preferred embodiment of the invention detects whether a load (e.g., load 30L) is connected to terminal TL at the drive output of on-chip power MOSFETs 52PU, 52PD. In this example, the presence of inductor I of load 30L is detected. If inductor I is present, latch 35 is reset so that line ENA_ON at its inverting output is driven back high, enabling AND gates 53PU, 53PD to respond to the signal lines SIG_PU, SIG_PD, respectively, to drive on-chip power MOSFETs 52PU, 52PD. If inductor I is not present, line ENA_ON remains low, so that AND gates 53PU, 53PD isolate on-chip power MOSFETs 52PU, 52PD from switching regulator circuitry 22. FIG. 6 is a timing diagram that illustrates this operation, as will now be described.

As in the first preferred embodiment of the invention, line ENA is at a low logic level prior to time t0, as shown in FIG. 6, after and during the power-up sequence of switching regulator 20. Upon power-up of inverter 33 and R-S latch 35, the low level at line ENA causes inverter 33 to present a low-to-high transition at its output, which is connected to the set input of latch 35. Latch 35 is thus set to an initial state of line ENA_ON (at the inverting output of latch 35) at a low logic level. The output of exclusive-OR gate 34 (line XOR34 of FIG. 6) is also initially low, because both line ENA and delayed line ENA_D are low, turning off transistor 39. Because no current conducted by transistor 39, current mirror 50 sources no current into resistor R1; as such, the voltage across resistor R1 is zero, and R1 pulls its input to AND gate 40 to ground as shown in FIG. 6. The output of AND gate 40, and therefore the output of AND gate 32, are therefore both at an initial low level.

At time t0, line ENA is driven high by enable function 23 (FIG. 2). This enables AND gate 32 to respond to the state at the output of AND gate 40. In addition, until the transition at line ENA propagates through delay stage 36, the output of exclusive-OR gate 34 (line XOR34) is driven high. This turns on transistor 39, if load 30L is connected at terminal TL. If load 30L is not connected to terminal TL, terminal TL will be floating, considering that line ENA_ON is initially low and thus both of transistors 52PU, 52PD will be turned off. In this event, if terminal TL is floating, no current will be conducted through transistor 39, and therefore no current will be mirrored through resistor R1 from the operation of current mirror 50. If no current is conducted through resistor R1, the voltage across resistor R1 will remain at zero, maintaining the corresponding input to AND gate 40 at a low logic level. This low logic level will force a low logic level at the input of AND gate 32, and thus at the output of AND gate 32. Latch 35 will not be reset as a result, maintaining line ENA_ON at a low logic level, and enabling off-chip power interface 26. At such time as the transition of line ENA propagates through delay stage 36, line ENA_D is driven high, forcing AND gate 40 to present a low logic level at its output for the duration of the operation of switching regulator 20. Off-chip power interface 26 thus remains enabled until the next power sequence.

On the other hand, if load 30L is in fact connected to terminal TL, the system is configured to use the on-chip power MOSFETs 52PU, 52PD. In this case, beginning at time t0, inductor I will begin to conduct current from current mirror 50 through transistor 39. This current is mirrored through resistor R1 (according to the current mirror factor M, relating to the size ratio between devices in the two legs of current mirror 50). Assuming the capacitance component of load 30L to be dominated by inductor I (in other words, the effect of the capacitor in load 30L is much smaller than the effect of inductor I), and also assuming that the initial voltage across this capacitance in load 30L is zero (i.e., the resistive portion of the load pulling it to ground), the voltage V(R1) across resistor R1 can be estimated as a linear relationship:

$$V(R1) = \frac{R1}{M} \cdot I_{TL} = V_{dd} \cdot t \cdot R1 \cdot \left(\frac{1}{LM}\right)$$

where $I_{TL}$ is the current sourced to terminal TL, which is of course mirrored into resistor R1 with the factor M (i.e, the current at terminal TL is M times the current through resistor R1). As shown in FIG. 6 by plot 30L_TRUE, the voltage V(R1) increases effectively linearly if load 30L is present, crossing threshold voltage $V_t$ at time t1. Examples of component values suitable for an example of output select circuit 125 include $V_{dd}$ at 5.0 volts, a current mirror ratio M of 100, resistor R1 at 330Ω, and inductor I having an inductance L of 1.0 μH; a threshold voltage $V_t$ of 1.65 volts is thus appropriate for a time duration (t0 to t1) of 0.1 μsec. The propagation delay of delay stage 36 is, again, preferably selected so that the duration of the period from time t0 to time t2 is on the order of twice the duration from time t0 to time t1.

In this event, voltage V(R1) exceeds threshold voltage $V_t$ at time t1, causing the output of AND gate 40 to be driven high (line ENA_D at the inverting input of AND gate 40 being low at this point, prior to time t2). This in turn causes a low-to-high transition at the output of AND gate 32, considering that line ENA is already at a high logic level. This low-to-high transition at the reset input of latch 35 resets latch 35, such that the inverting output of latch 35 drives line ENA_ON to a high logic level. Output select circuit 125 thus has detected the presence of load 30L at terminal TL, and in response enables the on-chip power MOSFETs 52PU, 52PD (i.e., by enabling AND gates 53PU, 53PD to respond to the signals on lines SIG_PU, SIG_PD, respectively). Off-chip power interface 26 (FIG. 2) is disabled in this event.

At time t2 in the example of FIG. 6, line ENA_D goes high as a result of the propagation delay of delay stage 36 expiring. At this time t2, the output of exclusive-OR gate 34 returns low (both of its inputs now being at a high level), turning off transistor 39. This blocks current from being conducted through transistor 39 from current mirror 50, and results in zero current conducted through resistor R1; the voltage across resistor R1 falls rapidly to zero, at ground, as a result. In addition, the inverting input of AND gate 40 also receives the high level on line ENA_D, which disables both AND gate 40 and AND gate 32 from driving any additional transitions at their respective outputs. Accordingly, following time t2, no further activity within output select circuit 125 can affect the state of latch 35. So long as switching regulator 20 remains powered (i.e., line ENA remains high), no other event can cause latch 35 to be set so that line ENA_ON is taken low again. The automatic sensing that no off-chip power MOSFET is connected to switching regulator 20 is thus complete, and is not repeated until another power cycle.

According to the preferred embodiments of the invention, therefore, a switching regulator is capable of automatically determining whether to enable on-chip power output devices, or to instead disable these on-chip power output devices and enable the driving of external power output devices. This determination requires no programming or control from any external circuit, and by its very nature maintains the result of the determination until the next power sequence event, eliminating the possibility of disruption of its output configuration. This invention is thus especially beneficial when applied to power management circuits and the like that themselves are responsible for the power-on sequence of an associated system, and is also especially beneficial when used in applications that present substantial load (i.e., draw substantial current) from regulated voltages.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A switching regulator, comprising:
voltage regulator circuitry, for generating switching control signals for producing a regulated voltage;
an on-chip power output driver function integrated into an integrated circuit with, and coupled to, the voltage regulator circuitry, the on-chip power output driver function comprising at least one power transistor for driving the regulated voltage at a first terminal responsive to the switching control signals, the first terminal suitable for connection to an external load;
an off-chip power interface, coupled to the voltage regulator circuitry, for applying control signals to a second terminal responsive to the switching control signals, the second terminal suitable for connection to an external power transistor; and
an output select circuit, coupled to one of the first and second terminals, for detecting the presence or absence of an external component at the one of the first and second terminals, and for enabling one of the on-chip power output driver function and the off-chip power interface responsive to the detecting.

2. The switching regulator of claim 1, wherein the output select circuit is for enabling the on-chip power output driver function responsive to detecting the absence of an external power transistor connected to the second terminal, and is for disabling the on-chip power output driver function responsive to detecting the presence of an external power transistor connected to the second terminal.

3. The switching regulator of claim 2, wherein the output select circuit comprises:
   a one-shot circuit, for generating a pulse signal responsive to power-up of the switching regulator;
   a passive circuit coupled to the second terminal;
   a charging circuit for charging the passive circuit during the pulse signal;
   a latch, for generating an output enable signal that, in a first state, enables the on-chip power output driver function and that, in a second state, disables the on-chip power output driver function;
   logic circuitry, for setting the latch to the first state responsive to a voltage across the passive circuit exceeding a threshold voltage during the pulse signal, and for setting the latch to the second state responsive to the voltage across the passive circuit not exceeding the threshold voltage during the pulse signal due to the presence of the external power transistor connected at the second terminal.

4. The switching regulator of claim 3, further comprising:
   an enable gate for generating a power-up signal to the one-shot circuit upon powering up of a power supply voltage applied to the switching regulator.

5. The switching regulator of claim 4, wherein the logic circuitry comprises:
   a first logic function, for generating a charge signal in a first state responsive to the voltage across the passive circuit exceeding the threshold voltage during the pulse signal, and for generating the charge signal in a second state responsive to the voltage across the passive circuit not exceeding the threshold voltage during the pulse signal;
   a second logic function for setting the latch in the second state responsive to the power-up signal, and for setting the latch in the first state responsive to receiving the charge signal in the first state.

6. The switching regulator of claim 5, wherein the first logic function forces the charge signal to the second state responsive to the end of the pulse signal.

7. A method of controlling a switching regulator to selectively enable and disable an on-chip power output function and an interface to off-chip power transistors, comprising the steps of:
   powering up the switching regulator;
   responsive to powering up the switching regulator, applying a current to an external terminal of the switching regulator;
   measuring the response at the external terminal; and
   enabling or disabling the on-chip power output function responsive to the measured response at the external terminal;
   wherein the applying step comprises:
      generating a pulse signal for a selected duration following the powering up step;
      responsive to the pulse signal, charging a passive circuit coupled to a terminal of the interface at which an off-chip power transistor can be connected;
   wherein the measuring step comprises:
      measuring the voltage across the passive circuit prior to the end of the duration of the pulse signal;
   and wherein the enabling or disabling step comprises:
      responsive to the voltage across the passive circuit exceeding a threshold voltage, generating an enable signal at a first state to enable the on-chip power output function;
      responsive to the voltage across the passive circuit not exceeding the threshold voltage by the end of the duration of the pulse signal, generating the enable signal at a second state to disable the on-chip power output function,
   wherein the enable signal is generated at the output of a latch; further comprising:
      responsive to the pulse signal, setting the latch into the second state;
   and wherein the step of generating the enable signal in the first state comprises:
      setting the latch into the first state.

8. The method of claim 7, wherein the enable signal is generated at the output of a latch;
   further comprising:
      responsive to the pulse signal, setting the latch into the second state;
   and wherein the step of generating the enable signal in the first state comprises:
      setting the latch into the first state.

9. A disk drive system, comprising:
   a power controller; and
   a power management circuit having a switching regulator, wherein the switching regulator, comprises:
      voltage regulator circuitry, for generating switching control signals for producing a regulated voltage;
      an on-chip power output driver function integrated into an integrated circuit with, and coupled to, the voltage regulator circuitry, the on-chip power output driver function comprising at least one power transistor for driving the regulated voltage at a first terminal responsive to the switching control signals, the first terminal suitable for connection to an external load; and
      an off-chip power interface, coupled to the voltage regulator circuitry, for applying control signals to a second terminal responsive to the switching control signals, the second terminal suitable for connection to an external power transistor; and
      an output select circuit, coupled to one of the first and second terminals, for detecting the presence or absence of an external component at the one of the first and second terminals, and for enabling one of the on-chip power output driver function and the off-chip power interface responsive to the detecting.

10. The switching regulator of claim 9, wherein the output select circuit is for enabling the on-chip power output driver function responsive to detecting the absence of an external power transistor connected to the second terminal, and is for disabling the on-chip power output driver function responsive to detecting the presence of an external power transistor connected to the second terminal.

11. The switching regulator of claim 10, wherein the output select circuit comprises:
   a one-shot circuit, for generating a pulse signal responsive to power-up of the switching regulator;
   a passive circuit coupled to the second terminal;
   a charging circuit for charging the passive circuit during the pulse signal;
   a latch, for generating an output enable signal that, in a first state, enables the on-chip power output driver function and that, in a second state, disables the on-chip power output driver function;

logic circuitry, for setting the latch to the first state responsive to a voltage across the passive circuit exceeding a threshold voltage during the pulse signal, and for setting the latch to the second state responsive to the voltage across the passive circuit not exceeding the threshold voltage during the pulse signal due to the presence of the external power transistor connected at the second terminal.

12. The switching regulator of claim 11, further comprising:
an enable gate for generating a power-up signal to the one-shot circuit upon powering up of a power supply voltage applied to the switching regulator.

13. The switching regulator of claim 12, wherein the logic circuitry comprises:
a first logic function, for generating a charge signal in a first state responsive to the voltage across the passive circuit exceeding the threshold voltage during the pulse signal, and for generating the charge signal in a second state responsive to the voltage across the passive circuit not exceeding the threshold voltage during the pulse signal;
a second logic function for setting the latch in the second state responsive to the power-up signal, and for setting the latch in the first state responsive to receiving the charge signal in the first state.

14. The switching regulator of claim 13, wherein the first logic function forces the charge signal to the second state responsive to the end of the pulse signal.

* * * * *